(No Model.)
L. NATHAN.
APPARATUS FOR RETAILING LIQUORS CONTAINING GAS UNDER PRESSURE.
No. 539,904. Patented May 28, 1895.
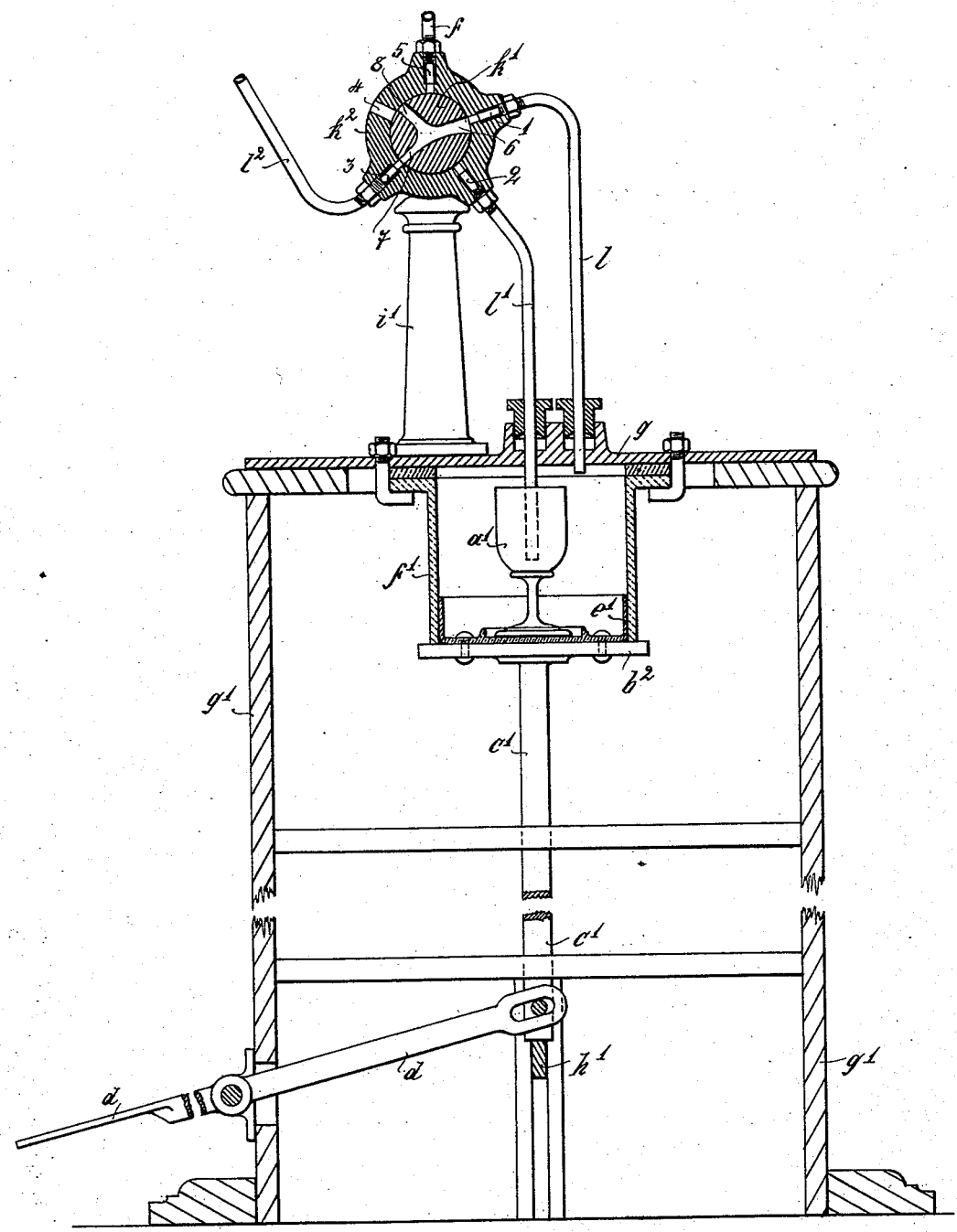
Witnesses:
Carl Rossbach
Emil Kayser
Inventor:
Leopold Nathan
by
Wm. C. Poulter
Attorney.

UNITED STATES PATENT OFFICE.

LEOPOLD NATHAN, OF ROTTWEIL, GERMANY.

APPARATUS FOR RETAILING LIQUORS CONTAINING GAS UNDER PRESSURE.

SPECIFICATION forming part of Letters Patent No. 539,904, dated May 28, 1895.

Application filed May 14, 1894. Serial No. 511,203. (No model.)

To all whom it may concern:

Be it known that I, LEOPOLD NATHAN, a subject of the King of Würtemberg, and a resident of Rottweil, in the Kingdom of Würtemberg, German Empire, have invented a new and useful Apparatus for Retailing Liquors Containing Gas under Pressure, of which the following is a specification.

If liquors containing gas under pressure (as for instance champagne, foaming fruit-juices and the like) are to be retailed, the great drawback arises, that the natural frothing of the liquor is nearly wholly lost, on account of the great reduction of pressure during the time of delivery, and of the intense foaming caused thereby. This may successfully be avoided by providing for the drinking-glass intended to receive the champagne or the like, and to be delivered over to the customer, a casing that may be tightly closed, and capable of resisting a pressure of a height like that of the gas of the liquor, and by providing, further, connections between the space of said casing with the vessel containing the liquor to be retailed, as well as with a source of pressure, which latter may be constituted either by the gas of the liquor, or, what is preferred, by a separate cylinder with liquid carbonic acid. After the glass has been placed into the said casing, and the latter is tightly closed, the gas is led over into the casing until the pressure within the latter is like or nearly like that within the container. The liquor may be then drawn off the latter without any foaming, so that the natural froth is fully preserved.

In order to make my invention more clear, I refer to the accompanying drawing, in which I have shown a vertical section through one mode of construction of my new apparatus. The same consists of a frame $g'$ of any desired or suitable construction, which carries at its top a plate $g$ holding a metal-cylinder $f'$. The latter is tightly closed at its upper end by said plate $g$ and by an india-rubber ring arranged between this plate and a flange of said cylinder. The glass $a'$ intended to receive the liquor is held in the cylinder $f'$ by a disk $b^2$ fixed to the top of a rod $c'$ adapted to be displaced longitudinally by a hand-lever $d$. Disk $b^2$, when in the position shown in the drawing is held in the same by a wedge $h'$, or by any other suitable contrivance. A leather-collar $e'$ having a cylindrical form and open at the upper end and secured to the upper surface of disk $b^2$ lies then close to the inner surface of casing $f'$, so that it may be tightly pressed against that wall as soon as the gas is turned on. The glass $a'$ may be placed in and removed from the casing $f'$ by lowering the said disk $b^2$ and collar until the same are sufficiently lowered to permit the glass to be inserted or withdrawn. The gas is led into casing $f'$ by pipe $l$, while the liquor is led over by pipe $l'$, which latter terminates shortly above the bottom of glass $a'$.

In order to make the necessary connections and disconnections between pipe $l$ and the source of gas, as well as between pipe $l'$ and the liquor-container, I prefer to arrange on plate $g$ a suitable cock, for instance such a one, as shown in the drawing. This cock consists of the casing $k^2$ with its five channels 1, 2, 3, 4 and 5, and of the plug $k'$ with its three channels 6, 7 and 8, the latter communicating with each other. Channel 3 of the casing is connected by pipe $l^2$ with the source of gas, for instance with a carbonic acid bottle, and by pipe $f$ with the vessel containing the liquor, for instance the champagne. The pressure of the carbonic acid gas is kept on a height corresponding wholly or nearly to that of the champagne. If, thus, all the movable parts of the apparatus are in the position shown in the drawing, the carbonic acid gas will flow into chamber $f'$ through pipe $l^2$, channels 3, 7, 6 and 1, and pipe $l$. After the pressure within chamber $f'$ has reached the proper height, plug $k'$ is turned, until the channels 5 and 2 of casing $k^2$ coincide with the channels 8 and 6 of the plug, when the liquor will flow into the glass through the pipes $f$ and $l'$. This occurs without any foaming and frothing, so that the natural froth of the champagne is fully preserved, and the latter may be delivered over to the customer in perfectly fresh condition.

In order to remove the filled glass from chamber $f'$, the latter must be relieved from the pressure. This is effected by turning plug $k'$ in the reverse direction until the channels 4 and 8 are coinciding. The carbonic acid contained within chamber $f'$ then escapes through pipe $l$ and the channels 1, 6, 8 and 4, and the disk $b^2$ with the glass may be lowered after wedge $h'$ or its equivalent has been removed.

I wish it to be understood, that the construction of the cock $k'$ $k^2$ and the arrangement of the pipes $l$ $l'$ $l^2$ and $f$ may be widely varied, as the proper manner of working of the main-part of the apparatus, namely of the casing that is adapted to receive a glass or the like, to resist a strong inner pressure with perfect relief of said glass, and to be tightly closed, is not dependent on said construction and arrangement.

An important point of my invention, touched upon already in the foregoing paragraph, lies in the perfect relief of the drinking-glass from any pressure, so that elegant and thin glasses may be used. This would be impossible, if the drinking-glass itself had to stand the pressure.

Having now fully described the nature of my invention, what I desire to secure by Letters Patent of the United States is—

1. In an apparatus of the character described, the combination with a casing open at its lower end, a disk adapted to temporarily seat against the lower end of the casing, an elastic cylindrical collar secured to said plate and adapted to be pressed tightly against the interior wall of the casing and pipes leading into the casing and adapted to be placed in communication exteriorly thereof with a source of liquid and carbonic acid gas supply, in the manner described.

2. The combination of the casing $f'$, a disk $b^2$ adapted to be moved vertically and to close the lower end of the casing, means for moving the disk as described, an elastic cylindrical collar secured to the disk and adapted to be pressed tightly against the interior wall of the casing, a pipe adapted to lead gas into the casing, a pipe adapted to lead the liquor thereinto, said pipes adapted to be placed in communication exteriorly of the casing with a source of liquid and carbonic acid gas supply in the manner described.

In testimony whereof I have signed this specification in the presence of two subscribing witnesses.

LEOPOLD NATHAN.

Witnesses:
G. JOY,
C. ARDELFINGER.